United States Patent
Zhu et al.

(10) Patent No.: US 11,582,609 B2
(45) Date of Patent: Feb. 14, 2023

(54) WIRELESS USER EQUIPMENT (UE) AUTHORIZATION BASED ON UE TYPE AND NETWORK IDENTIFIER

(71) Applicant: T-MOBILE INNOVATIONS LLC, Overland Park, KS (US)

(72) Inventors: Lei Zhu, Overland Park, KS (US); Kimberly Sue Nittler, Overland Park, KS (US); Anuj Sharma, Broadlands, VA (US); Michael L. Ayres, Overland Park, KS (US); Elaheh Moayer, Mclean, VA (US); Deepesh Belwal, Ashburn, VA (US); Anil Kumar Mariyani, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 223 days.

(21) Appl. No.: 16/880,601

(22) Filed: May 21, 2020

(65) Prior Publication Data

US 2021/0368342 A1    Nov. 25, 2021

(51) Int. Cl.
*H04W 12/08* (2021.01)
*H04L 9/40* (2022.01)

(52) U.S. Cl.
CPC .......... *H04W 12/08* (2013.01); *H04L 63/101* (2013.01)

(58) Field of Classification Search
CPC .............................. H04W 12/08; H04L 63/101
USPC ............................................................. 726/4
See application file for complete search history.

(56) References Cited

U.S. PATENT DOCUMENTS

| | | | |
|---|---|---|---|
| 9,521,539 B2 | 12/2016 | Gorey et al. | |
| 10,021,570 B1* | 7/2018 | Cai | H04W 48/18 |
| 10,299,094 B2* | 5/2019 | Kotecha | H04W 12/08 |
| 2002/0087674 A1 | 7/2002 | Guilford et al. | |
| 2015/0215832 A1 | 7/2015 | Fitzpatrick | |
| 2015/0358807 A1* | 12/2015 | Gorey | H04W 48/18 455/432.1 |
| 2018/0206089 A1* | 7/2018 | Cavalcanti | H04W 48/16 |
| 2018/0220256 A1* | 8/2018 | Kotecha | H04W 4/70 |
| 2018/0324662 A1* | 11/2018 | Phuyal | H04B 7/18504 |

(Continued)

FOREIGN PATENT DOCUMENTS

GB    2577861 A  *  4/2020  ............ H04W 24/10

OTHER PUBLICATIONS

Samir Ferdi, et al.; "Dynamic Authorization for 5G Systems"; 2018 IEEE Conference on Standards for Communications and Networking (CSCN); Oct. 29, 2018; pp. 1-5; IEEE.

(Continued)

*Primary Examiner* — Samson B Lemma

(57) ABSTRACT

Network circuitry authorizes User Equipment (UEs) for wireless services from wireless networks. The network circuitry stores lists of network identifiers that are associated with UE types. The network circuitry receives an authorization request that indicates a network identifier and a UE type. The UE type comprises model, operating system, user application, and/or radio frequency. The network circuitry retrieves a networks list for the UE type and compares the network identifier from the authorization request to the network identifiers on the network list. The authorization circuitry authorizes the UE responsive to a match between the network identifier from the authorization request and a network identifier on the network list.

20 Claims, 7 Drawing Sheets

(56) References Cited

U.S. PATENT DOCUMENTS

| | | | |
|---|---|---|---|
| 2018/0376384 A1 | 12/2018 | Youn et al. | |
| 2019/0021064 A1* | 1/2019 | Ryu et al. | |
| 2019/0124561 A1* | 4/2019 | Faccin | H04W 8/02 |
| 2019/0159108 A1* | 5/2019 | Lee | H04W 76/27 |
| 2019/0174449 A1 | 6/2019 | Shan et al. | |
| 2019/0342851 A1* | 11/2019 | Shan | H04W 12/06 |
| 2020/0037386 A1 | 1/2020 | Park et al. | |
| 2021/0212134 A1* | 7/2021 | Sternberg | H04W 76/11 |

OTHER PUBLICATIONS

"5G; Security architecture and procedures for 5G System"; 3GPP TS 33.501 version 15.8.0 Release 15; Mar. 31, 2020; pp. 1-194; ETSI.

* cited by examiner

US 11,582,609 B2

WIRELESS USER EQUIPMENT (UE) AUTHORIZATION BASED ON UE TYPE AND NETWORK IDENTIFIER

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. For example, a human may operate a phone to participate in a mobile video-conference. In another example, an unmanned aerial vehicle may wirelessly receive navigation instructions while in-flight. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), Low-Power Wide Area Network (LP-WAN), and Millimeter Wave (MMW).

The typical wireless communication network reserves its network resources for its own customers by restricting the wireless data services that are provided to non-customers. In emergency situations, the wireless communication network serves non-customers with emergency services. In roaming situations, the wireless communication network serves non-customers with wireless data services that are authorized by another wireless communication network. This other wireless communication network is sometimes called a "partner" network.

To authorize a wireless user device, the wireless communication network checks a device identifier that was received from the wireless user device against a list of authorized device identifiers. In the roaming situations, the visited network requests authorization from the home network, and the home network authorizes their own wireless user devices based on the visited network ID and possibly the device ID.

The present use of the network identifiers and device identifiers for authentication limits user access to the wireless communication networks. The list of network identifiers is often small and omits some networks. The list of device identifiers is often large and requires cumbersome editing on a per-device basis. Unfortunately, the authentication of the wireless user devices remains monolithic and complicated.

TECHNICAL OVERVIEW

Network circuitry authorizes User Equipment (UEs) for wireless services from wireless networks. The network circuitry stores lists of network identifiers that are associated with UE types. The network circuitry receives an authorization request that indicates a network identifier and a UE type. The UE type comprises model, operating system, user application, and/or radio frequency. The network circuitry retrieves a networks list for the specific UE type and compares the network identifier from the authorization request to the network identifiers on the selected network list. The authorization circuitry authorizes the UE responsive to a match between the network identifier from the authorization request and a network identifier on the selected network list.

DETAILED DESCRIPTION

Figure 1:
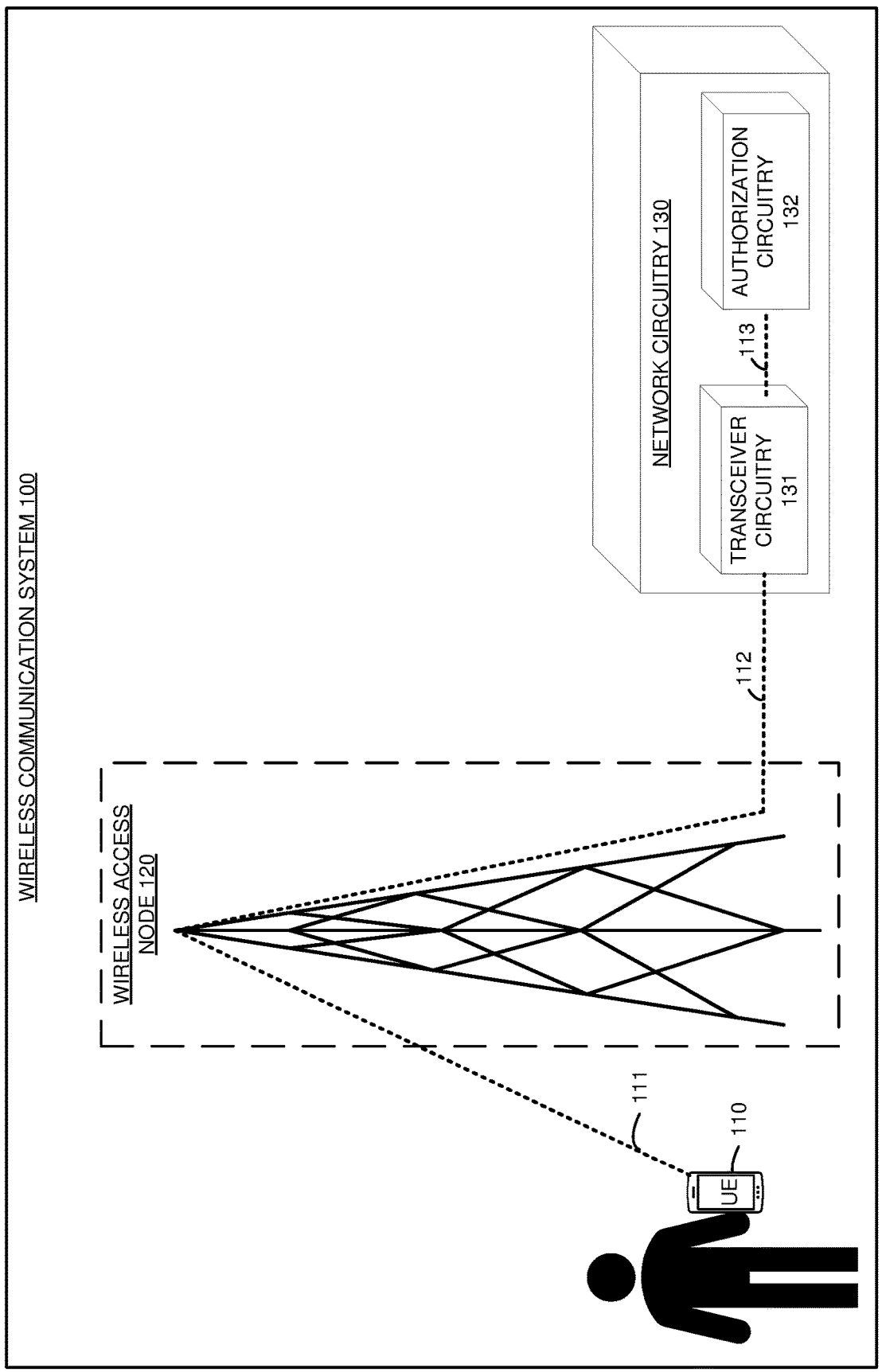
FIG. 1 illustrates network circuitry to authorize wireless User Equipment (UEs) based on UE types and network identifiers.

FIG. 1 illustrates network circuitry 120 in wireless communication system 100 to authorize wireless User Equipment (UE) 110 based on UE type and network identifier. Wireless communication system 100 comprises wireless UE 110, wireless access node 120, and network circuitry 130. Wireless access node 120 supports wireless data services that comprise content-streaming, media-conferencing, interactive-gaming, social networking, augmented-reality, and/or the like. In network circuitry 130, authorization circuitry 132 stores UE lists and network lists. The UE lists have UE Identifiers (IDs), and the network lists have network IDs. Different network lists are associated with different UE types, wireless data services, times, and/or some other information.

Various examples of network operation and configuration are described herein. In one example, UE 110 wirelessly attaches to wireless access node 120 over wireless link 111 to receive one or more wireless data services. During the wireless attachment, UE 110 wirelessly receives a network ID from wireless access node 120. During wireless attachment, UE 110 wirelessly transfers the network ID, UE ID, one or more UE types, and one or more service IDs to wireless access node 120. In response, wireless access node 120 transfers an authorization request for UE 110 to network circuitry 130 over data link 112. The authorization request for the UE 110 indicates the network ID, UE ID, UE types, and service IDs. Although data link 112 is depicted as a direct link for clarity, data link 112 may include multiple network elements and may cross network boundaries.

In network circuitry 130, transceiver circuitry 131 receives the authorization request for UE 110 from wireless access node 120 over data link 112. Transceiver circuitry 131 transfers the authorization request for UE 110 to authorization circuitry 132 over network link 113. Initially, authorization circuitry 132 retrieves a preferred network list and checks the network ID from UE 110 against the network IDs on the preferred network list for a match. When a match is detected, authorization circuitry 132 generates a positive authorization response for UE 110.

When no match is detected in the preferred network list, authorization circuitry 132 retrieves one or more network lists for the UE types and checks the network ID from UE 110 against the network IDs on the network lists for the UE types. For example, authorization circuitry 132 may retrieve a network list for a specific operating system version used by UE 110 and check the network ID from UE 110 against the network IDs on the network list for the operating system version. When a match is detected, authorization circuitry 132 generates a positive authorization response for UE 110.

When no match is detected in the network lists for the UE types, authorization circuitry 132 retrieves one or more network lists for the wireless data services. For example, authorization circuitry 132 may retrieve a network list for a specific drone-control service requested by UE 110 and check the network ID from UE 110 against the network IDs on the network list for the drone-control service. Authorization circuitry 132 checks the network ID from UE 110 against the network IDs on the network lists for the wireless data services. When a match is detected, authorization circuitry 132 generates a positive authorization response for UE 110.

When no match is detected on the network lists for the wireless data services, authorization circuitry 132 retrieves one or more network lists for the current time-of-day, day, and date. Other lists associated with location, velocity, or some other data could be used as well. Authorization circuitry 132 checks the network ID from UE 110 against the network IDs on the network lists for the time, day, date, and so on. When a match is detected, authorization circuitry 132 generates a positive authorization response for UE 110. When no match is detected on the network lists for time, day, date, and so on, authorization circuitry 132 retrieves one or more UE lists. Authorization circuitry 132 checks the UE ID from UE 110 against the UE IDs on the UE lists. When a match is detected, authorization circuitry 132 generates a positive authorization response for UE 110. When no match is detected in the UE lists, authorization circuitry 132 generates a negative authorization response for UE 110.

Authorization circuitry 132 transfers the positive or negative authorization response for UE 110 to transceiver circuitry 131 over network link 113. Transceiver circuitry 131 transfers the positive or negative authorization response for UE 110 to wireless access node 120 over data link 112. Wireless access node 120 transfers the positive or negative authorization response to UE 110 over wireless link 111. When the authorization response for UE 110 is positive, wireless access node 120 delivers the wireless data services to UE 110 over wireless link 111. For example, wireless access node 120 may deliver a media-conferencing service to UE 110 in response to a specific user application for media-conferencing that is executing in UE 110.

Network circuitry 130 also authenticates UE 110 to verify the UE ID for UE 110—typically through the exchange of cipher data with UE 110. Authorization circuitry 132 may authorize UE 110 before or after UE authentication, but wireless communication system 100 requires both authentication and authorization before delivering network service to UE 110. For clarity, the accurate authentication of UE 110 is assumed for the operations described herein. A UE that fails authentication would not be typically served by wireless communication system 100.

In some alternative examples, authorization circuitry 132 stores and retrieves some data like UE type and service ID instead of receiving the data in the authorization request. For example, authorization circuitry 132 may retrieve the operating system ID for UE 110 from a local database using the UE ID received in the authorization request.

In some alternative examples, authorization circuitry 132 transfers negative authorization responses in response to a match instead of a positive authorization response. Thus, authorization circuitry 132 may black-list UE 110 in a similar manner to the white-listing described above.

Although UE 110 is depicted as a smartphone operated by a human on FIG. 1, UE 110 might instead comprise a computer, robot, vehicle, or some other data appliance with wireless communication circuitry. UE 110 may or may not be operated by a human. UE 110 has a UE ID that comprises an International Mobile Subscriber Identifier (IMSI), International Mobile Equipment Identifier (IMEI), Media Access Control (MAC) ID, Subscriber Identity Module (SIM) code, and/or the like. UE 110 also has UE types that comprise information like model number, operating system ID, user application ID, radio frequency ID, and/or some other UE characterization.

Wireless access node 120 has a network ID that comprises a Public Land Mobile Network Identifier (PLMN), Virtual Private Network (VPN) ID, wireless network slice ID, and/or the like. Wireless access node 120 is depicted by a tower, but access node 120 may use other mounting structures or no mounting structure at all. Wireless access node 120 comprises a Fifth Generation New Radio (5GNR) gNodeB, Long Term Evolution (LTE) eNodeB, Evolved Universal Terrestrial Radio Access Network New Radio Dual Connectivity (EN-DC) node, Institute of Electrical and Electronic Engineers (IEEE) 802.11 (WIFI) hotspot, Low-Power Wide Area Network (LP-WAN) access node, Millimeter Wave (MMW) radio hub, and/or some other wireless network apparatus. In some examples, authorization circuitry 132 comprises a Fifth Generation Core (5GC) Security Edge Protection Proxy (SEPP), Authentication Server Function (AUSF), Unified Data Management (UDM), Policy Control Function (PCF), Unified Data Repository (UDR), and/or some other 5GC functions.

UE 110 and access node 120 comprise antennas, amplifiers, filters, modulation, analog/digital interfaces, microprocessors, software, memories, transceivers, bus circuitry, and the like. Network circuitry 130 comprises microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication system 100 as described herein.

Wireless link 111 uses over-the-air air electromagnetic frequencies in the low-band, mid-band, high-band, or some other portion of the electromagnetic spectrum. Wireless link 111 uses protocols like 5GNR, LTE, WIFI, LP-WAN, MMW and/or some other wireless communication format. Links 112-113 use metal, glass, air, or some other media. Links 112-113 use IEEE 802.3 (Ethernet), Time Division Multiplex (TDM), Data Over Cable System Interface Specification (DOCSIS), Internet Protocol (IP), 5GC, 5GNR, Hypertext Transfer Protocol Version 2 (HTTP/2), Next Generation Application Protocol (NG-AP), LTE, WIFI, virtual switching, inter-processor communication, bus interfaces, and/or some other data communication protocols. Links 111-113 may comprise intermediate network elements like relays, routers, and controllers.

Figure 2:
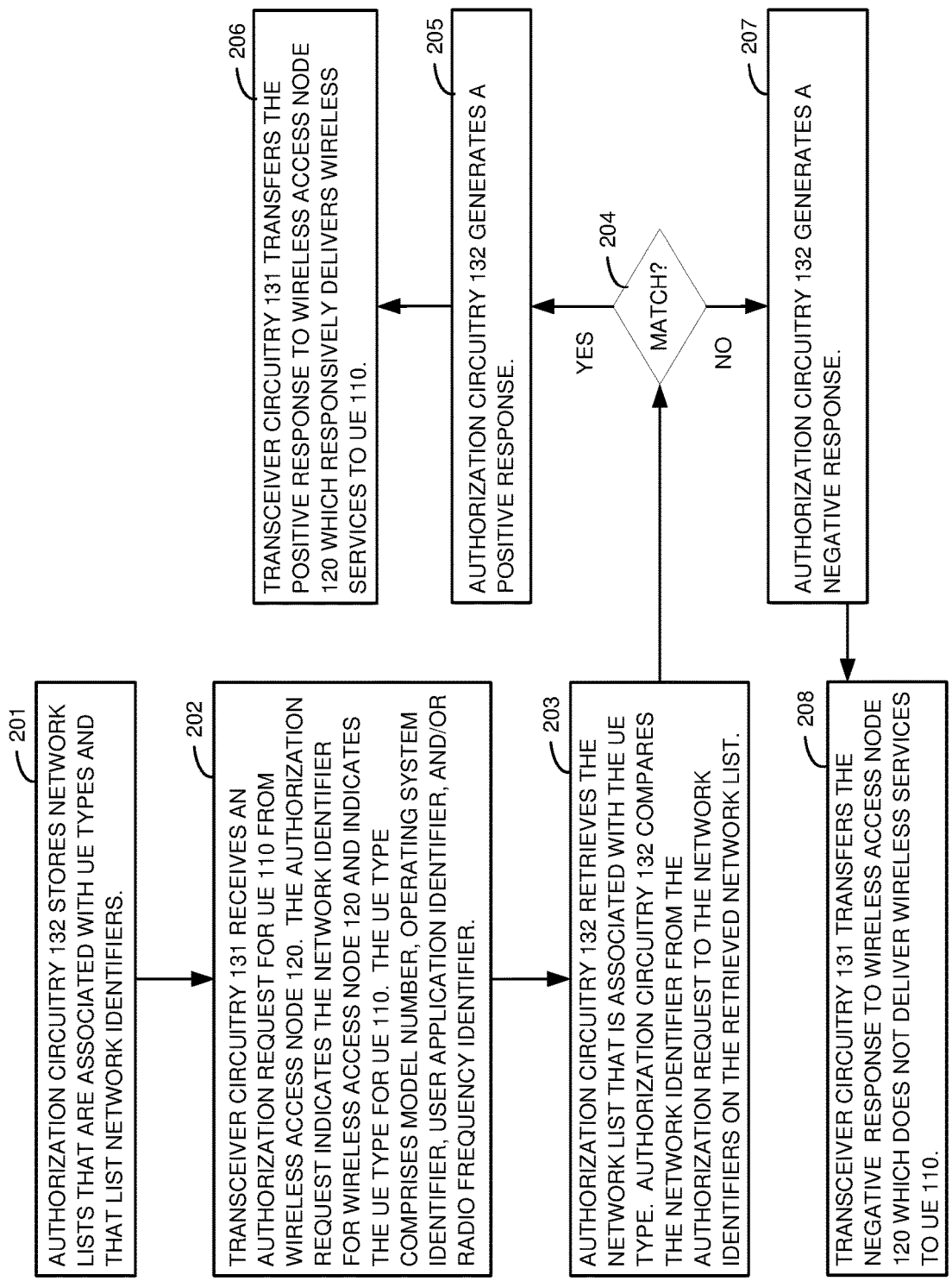
FIG. 2 illustrates the operation of the network circuitry to authorize the wireless UEs based on UE types and network identifiers.

FIG. 2 illustrates another exemplary operation of network circuitry 130 to authorize wireless UE 110 based on UE type and network identifier. Authorization circuitry 130 stores network lists that are associated with UE types and that list network IDs (201). Transceiver circuitry 131 receives an authorization request for UE 110 from wireless access node 120 that indicates a network ID and a UE type (202). The UE type comprise model number, operating system ID, user application ID, and/or radio frequency ID. Authorization circuitry 132 retrieves a network list for the UE type (203). Authorization circuitry 132 compares the network ID from the authorization request to the network IDs from the network list for the UE type.

When a match is detected (204), authorization circuitry 132 generates a positive authorization response for UE 110 (205). Transceiver circuitry 131 transfers the positive authorization response for UE 110 to wireless access node 120, and wireless access node 120 responsively delivers wireless data services to UE 110 (206). For example, wireless access node 120 may deliver an augmented-reality service to UE 110 in response to a special radio frequency that is used by UE 110. When no match is detected (204), authorization circuitry 132 generates a negative authorization response for UE 110 (207). Transceiver circuitry 131 transfers the negative authorization response for UE 110 to wireless access node 120, and in response, wireless access node 120 does not deliver wireless data services to UE 110 (208).

Figure 3:
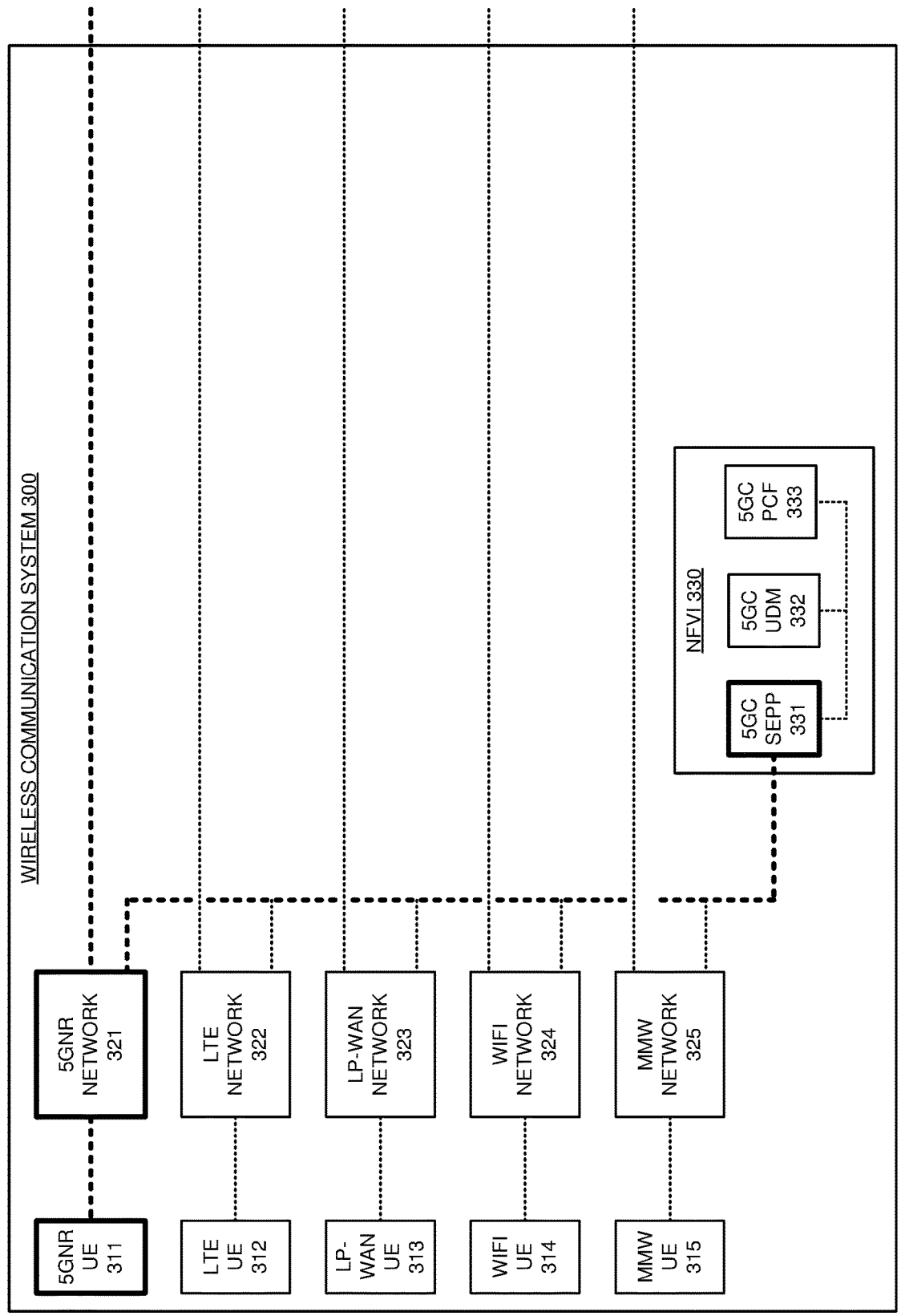
FIG. 3 illustrates a Fifth Generation Core (5GC) Security Edge Protection Proxy (SEPP) to authorize UEs based on UE types, wireless services, and network identifiers.

FIG. 3 illustrates Fifth Generation Core (5GC) Security Edge Protection Proxy (SEPP) 331 that authorizes UEs 311-315 based on UE types, wireless services, and network identifiers. SEPP 331 is an example of network circuitry 130, although network circuitry 130 may differ. Wireless communication system 300 comprises UEs 311-315, networks 321-325, and NFVI 330. NFVI 330 comprises 5GC SEPP 331, 5GC Unified Data Management (UDM) 332, and 5GC Policy Control Function (PCF) 333. Wireless communication system 300 supports wireless data services like content-delivery, conferencing, machine-control, social-networking, sensor-networking, or some other wireless networking product.

Networks 321-325 comprise Fifth Generation New Radio (5GNR) network 321, Long Term Evolution (LTE) network 322, Low-Power Wide Area Network (LP-WAN) network 323, Institute of Electrical and Electronic Engineers (IEEE) 802.11 (WIFI) network 324, and Millimeter Wave (MMW) network 325. 5GNR UE 311 is wirelessly linked to 5GNR network 321. LTE UE 312 is wirelessly linked to LTE network 322. LP-WAN UE 313 is wirelessly linked to LP-WAN 323. WIFI UE 314 is wirelessly linked to WIFI network 324. MMW UE 315 is wirelessly linked to MMW network 325. Networks 321-325 are linked to 5GC SEPP 331 in NFVI 330. In NFVI 330, 5GC SEPP 331 is linked to 5GC UDM 332 and PCF 333.

5GC SEPP 331 stores Public Land Mobile Network Identifier (PLMNs ID) lists. The PLMN lists are associated with UE types, wireless data services, times, days, dates, preferred networks, and possibly other data like location. The UE types comprise model number, operating system, user application, radio frequency, or some other UE-related information. The wireless data services comprise pre-paid service, Mobile Virtual Network Operator (MVNO) service, content-delivery, conferencing, machine-control, sensor networking, or some other wireless networking product. 5GC UDM 332 and/or PCF 333 store International Mobile Subscriber Identifier (IMSI) lists.

5GNR network 321 broadcasts its PLMN. 5GNR UE 311 receives the PLMN and wirelessly attaches to 5GNR network 321. 5GNR UE 311 wirelessly transfers the following data to 5GNR network 321 to authorize 5GNR UE 311: PLMN, IMSI, operating system ID, user application IDs, radio frequency ID, internet-access ID, and media-conferencing ID. 5GNR network 321 transfers an authorization request for UE 311 to 5GC SEPP 331. The authorization request indicates the PLMN, IMSI, operating system ID, user application ID, radio frequency ID, internet-access ID, and media-conferencing ID.

In NFVI 330, 5GC SEPP 331 receives the authorization request for 5GNR UE 311 from 5GNR network 321. Initially, SEPP 331 checks the PLMN against a preferred PLMN list. When a match is detected, SEPP 331 transfers a positive authorization response for UE 311 to 5GNR network 321, and 5GNR network 321 delivers the internet-access service and media-conferencing service to 5GNR UE 311. When no match is detected, SEPP 331 sequentially checks the PLMN from UE 311 against PLMN lists for the UE types including operating system ID, user application ID, and radio frequency ID. When a match is detected, SEPP 331 transfers positive authorization response for UE 311 to 5GNR network 321, and 5GNR network 321 delivers the internet-access service and media-conferencing service to 5GNR UE 311. When no match is detected, SEPP 331 sequentially checks the PLMN from UE 311 against the PLMN lists for the services including internet-access service and the media-conferencing service. SEPP 331 may use a single PLMN list for a combination of services like texting, voice-calling, and internet-access. When a match is detected, SEPP 331 transfers a positive authorization response for UE 311 to 5GNR network 321, and 5GNR network 321 delivers the internet-access service and media-conferencing service to 5GNR UE 311. When no match is detected, SEPP 331 checks the PLMN ID from UE 311 against PLMN lists for the time, day, date, and so on. When a match is detected, SEPP 331 transfers a positive authorization response for UE 311 to 5GNR network 321, and 5GNR network 321 delivers the internet-access service and media-conferencing service to 5GNR UE 311.

When no match is detected by SEPP 331, SEPP 331 transfers the IMSI and PLMN to UDM 332 and/or PCF 333. UDM 332 and/or PCF 333 check the IMSI for UE 311 against their IMSI lists. When a match is detected, UDM 332 and/or PCF 333 transfer a positive authorization response for UE 311 to SEPP 331. SEPP 331 transfers the positive authorization response to 5GNR network 321, and 5GNR network 321 delivers the internet-access service and media-conferencing service to 5GNR UE 311. When no match is detected in the IMSI lists, UDM 332 and/or PCF 333 transfer a negative authorization response for UE 311 to SEPP 331. SEPP 331 transfers the negative authorization response to 5GNR network 321, and 5GNR network 321 does not deliver the internet-access service or the media-conferencing service to 5GNR UE 311.

Note that other 5GC functions like an Authentication Server Function (AUSF) may serve SEPP 331 to authorize UEs 311-315 in a similar manner to UDM 332 and PCF 333. Also note that SEPP 331, UDM 332, PCF 333, and other 5GC functions may store and retrieve some data like UE model number and internet-access ID by IMSI (instead of receiving the data in the authorization request). For example, UDM 332 and PCF 333 may be coupled to a Unified Data Repository (UDR) that stores UE types and service IDs in association with the IMSIs for UEs 311-315. The UDR may store authorization data and lists for SEPP 331, UDM 332, PCF 333, and/or other 5GC functions that authorize UEs 311-315.

5GC functions like Access and Mobility Management Function (AMF), Authentication Server Function (AUSF), and UDM interact to authenticate the IMSIs for UEs 311-315 during UE authorization. Wireless communication system 300 requires both authentication and authorization before delivering network service to UEs 311-315. For clarity, the accurate authentication of UEs 311-315 is assumed for the operations described herein. A UE that fails authentication would not typically be served by wireless communication system 300.

In NFVI 330, the 5GC functions positively authorize UEs 311-315 when their PLMNs or IMSIs are on the lists and negatively authorize UEs 311-315 when their PLMNs or IMSIs are on not the lists. Alternatively, the 5GC functions may negatively authorize UEs 311-315 when their PLMNs or IMSIs are on some lists (blacklists). Both white lists and blacklists may be used.

UEs 312-315 and respective networks 322-325 are configured and operate in a similar manner to authorize UEs 312-315 for wireless data services. For example, SEPP 331 may authorize LTE UE 312 for texting over LTE network 322 based on a particular user application that is executing in LTE UE 312. SEPP 331 may authorize LP-WAN UE 313 for a sensor configuration session over LP-WAN network 323 based on the particular radio frequency used by LP-WAN UE 313. SEPP 331 may authorize WIFI UE 314 for emailing over WIFI network 324 based on the particular operating system version executing in WIFI UE 314. SEPP 331 may authorize MMW UE 315 for a virtual reality service over MMW network 325 based on the model number of MMW UE 315.

Figure 4:
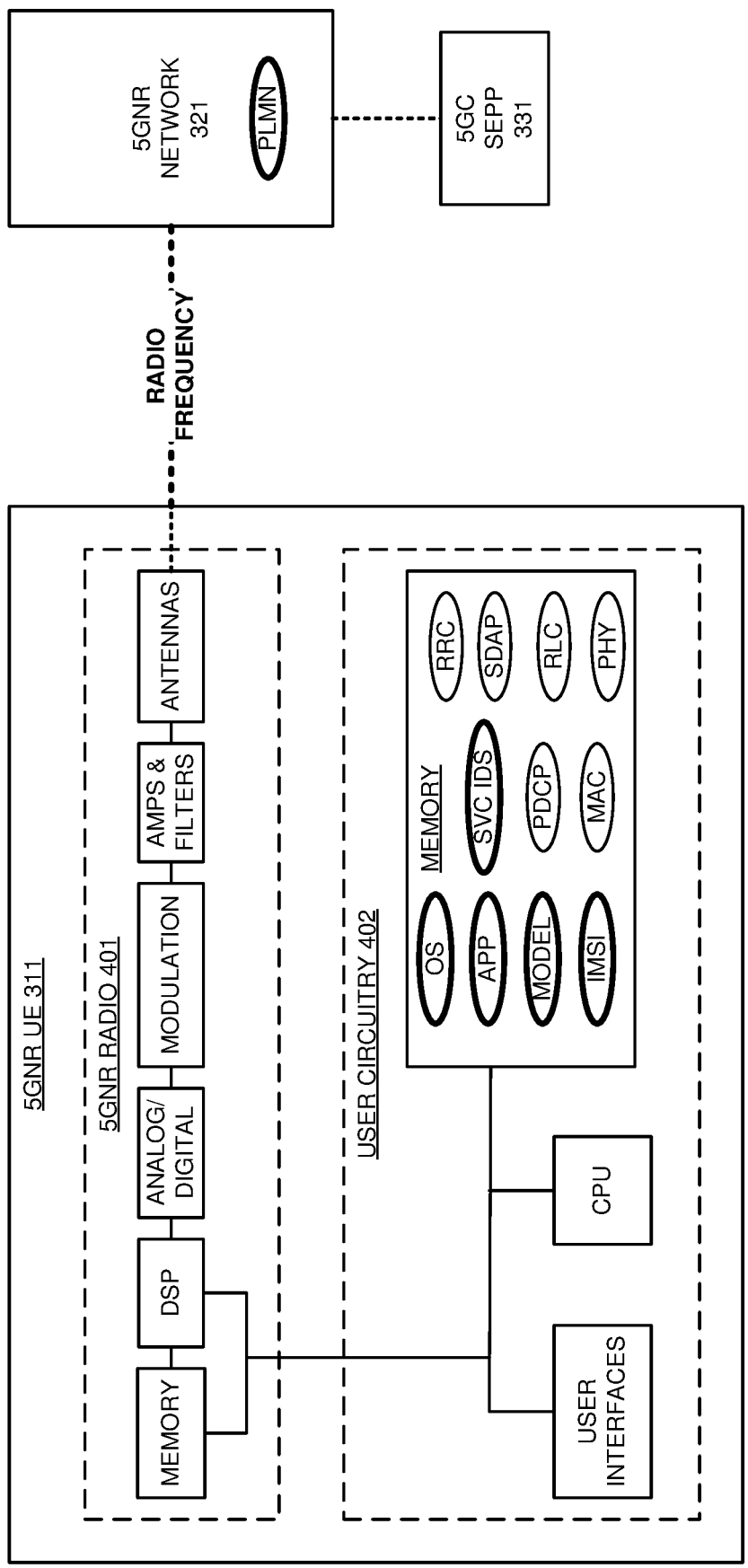
FIG. 4 illustrates Fifth Generation New Radio (5GNR) UE that is authorized by UE type, wireless services, and network identifiers.

FIG. 4 illustrates Fifth Generation New Radio (5GNR) UE 311 that is authorized by UE types, wireless services, and network identifiers. 5GNR UE 311 is an example of UE 110, although UE 110 may differ. 5GNR UE 311 comprises 5GNR radio 401 and user circuitry 402 that are coupled over bus circuitry. 5GNR radio 401 comprises antennas, amplifiers, filters, modulation, analog-to-digital interfaces, DSP, and memory that are coupled over bus circuitry. User circuitry 402 comprises user interfaces, CPU, and memory that are coupled over bus circuitry. The antennas in 5GNR radio 401 are wirelessly coupled to 5GNR network 321 over a specific radio frequency. The user interfaces in user circuitry 402 comprise graphic displays, machine controllers, sensors, cameras, transceivers, and/or some other user components. The memory in user circuitry 402 stores an operating system (OS), user applications (APP), model number (MODEL), IMSI, service (SVC) IDs, and network applications (PHY, MAC, RLC, PDCP, SDAP, and RRC). The CPU in user circuitry 402 executes the operating system and the user applications to generate and consume user data. The CPU in user circuitry 402 executes the operating system and the network applications to wirelessly exchange corresponding signaling and data with 5GNR network 321 over 5GNR radio 401 and the radio frequency.

In 5GNR radio 401, the antennas receive wireless 5GNR signals from 5GNR network 321 over the radio frequency. The wireless 5GNR signals transport DL 5GNR signaling and DL 5GNR data. The antennas transfer corresponding electrical DL signals through duplexers to the amplifiers. The amplifiers boost the received DL signals for filters which attenuate unwanted energy. In modulation, demodulators down-convert the DL signals from their carrier frequency. The analog/digital interfaces convert the analog DL signals into digital DL signals for the DSP. The DSP recovers DL 5GNR symbols from the DL digital signals and transfers the DL 5GNR symbols to user circuitry 402. The CPU in user circuitry 402 executes the network applications to process the DL 5GNR symbols and recover the DL 5GNR signaling and the DL 5GNR data. The network applications transfer corresponding DL user data to the user applications over the operating system.

The network applications process the DL 5GNR signaling and user requirements to generate UL 5GNR signaling. The user applications transfer UL user data to the network applications over the operating system. The network applications process the UL 5GNR signaling and the UL 5GNR data to generate corresponding UL 5GNR symbols. The network applications transfer the UL 5GNR symbols to the DSP in radio 401. In radio 401, the DSP processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless signals that transport the UL 5GNR signaling and corresponding UL 5GNR data to 5GNR network 321 over the radio frequency.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARD), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The RRC in 5GNR UE 311 receives the PLMN from 5GNR network 321 and wirelessly attaches to 5GNR network 321. The RRC in 5GNR UE 311 wirelessly transfers the following data to 5GNR network 321 for authorization: PLMN, IMSI, operating system ID, user application IDs, radio frequency ID, internet-access ID, and media-conferencing ID. The network applications in 5GNR UE 311 wirelessly exchange 5GNR signaling and data with 5GNR network 321 to receive the internet-access service and the media-conferencing service in response to authorization. UEs 312-315 are configured and operate in a similar manner using their own PLMNs, IMSIs, UE types, and service IDs to obtain their own wireless data services.

Figure 5:
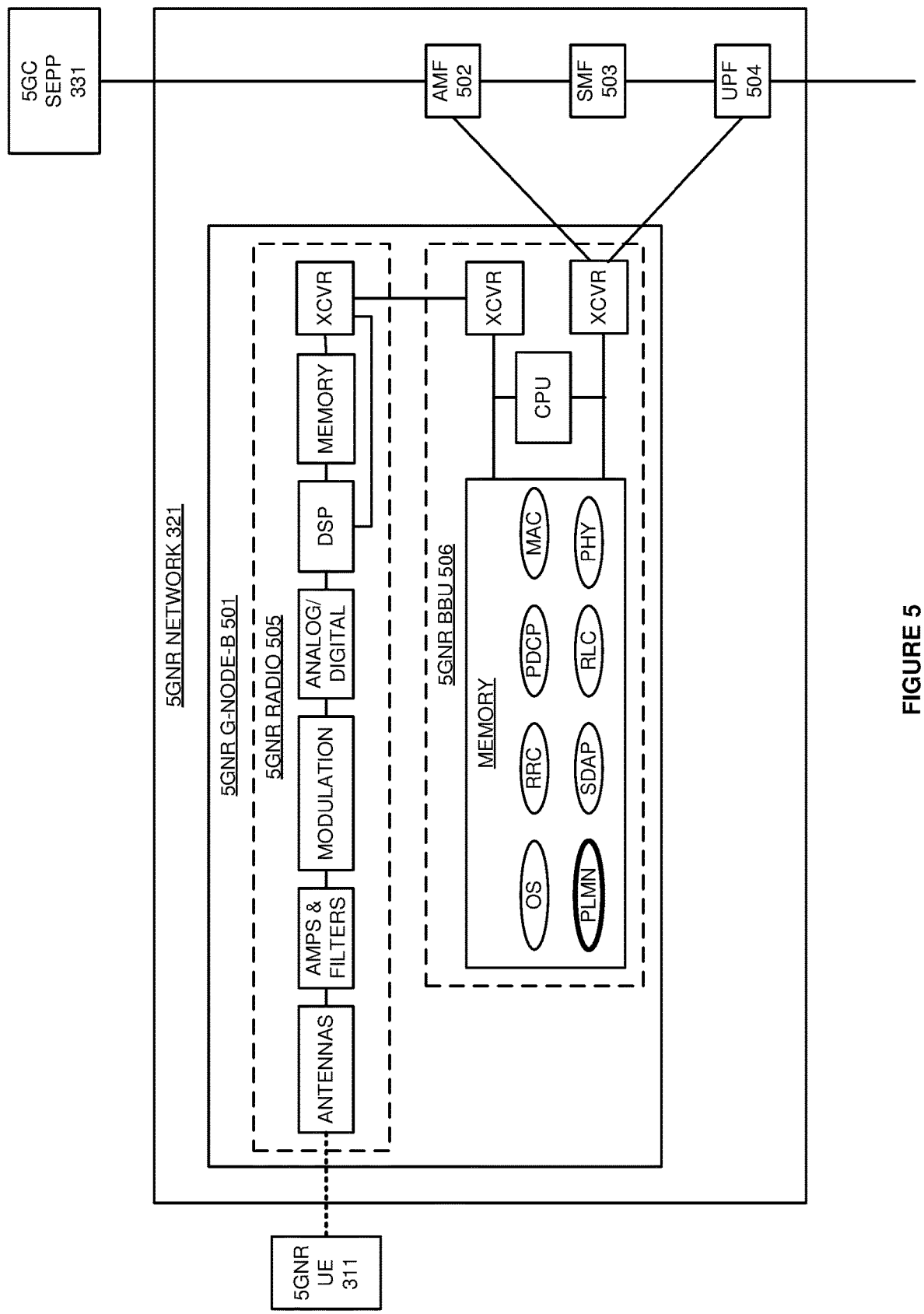
FIG. 5 illustrates a 5GNR network that obtains the authorization for the 5GNR UE based on UE type, wireless services, and network identifiers.

FIG. 5 illustrates 5GNR network 321 to obtain authorization for 5GNR UE 311 based on UE types, wireless services, and network identifiers. 5GNR network 321 is an example of wireless access node 120, although node 120 may differ. 5GNR network 321 comprises 5GNR gNodeB 501, 5GC Access and Mobility Management Function (AMF) 502, 5GC Session Management Function (SMF) 503, and 5GC User Plane Function (UPF) 504. 5GNR gNodeB 501 comprises 5GNR radio 505 and 5GNR Baseband Unit (BBU) 506. 5GNR radio 505 comprises antennas, amplifiers, filters, modulation, analog-to-digital interfaces, DSP, memory, and transceivers that are coupled over bus circuitry. BBU 506 comprises memory, CPU, and transceivers that are coupled over bus circuitry. The memory in BBU 506 stores a PLMN, operating systems, network applications (PHY, MAC, RLC, PDCP, RRC, and SDAP). The CPU in BBU 506 executes the operating systems, PHYs, MACs, RLCs, PDCPs, SDAPs, and RRCs to exchange network signaling with 5GNR UE 311 and AMF 502 and to exchange user data between 5GNR UE 311 and UPF 504. 5GNR UE 311 is wirelessly coupled to the antennas in 5GNR radio 505 over a radio frequency. The transceiver in 5GNR radio 505 is coupled to a transceiver in 5GNR BBU 506 over CPRI links. A transceiver in 5GNR BBU 506 is coupled to AMF 502 and UPF 504 over backhaul links.

In 5GNR radio 505, the antennas receive wireless 5GNR signals from 5GNR UE 311 over the radio frequency that transport UL 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR RRC processes the UL 5GNR signaling and Downlink (DL) N2 signaling from AMF 502 to generate new UL N2 signaling and new DL 5GNR signaling. The 5GNR RRC transfers the new UL N2 signaling to AMF 502. The 5GNR SDAP transfers the UL 5GNR data to UPF 504 over the backhaul links.

In 5GNR BBU 506, the 5GNR RRC receives the DL N2 signaling from AMF 502. The 5GNR SDAP receives DL 5GNR data from UPF 504. The 5GNR network applications process the new DL 5GNR signaling and the DL 5GNR data to generate corresponding DL 5GNR symbols that carry the DL 5GNR signaling and DL 5GNR data. In 5GNR radio 505, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling and DL 5GNR data to 5GNR UE 311 over the radio frequency.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

The RRC in 5GNR BBU 506 broadcasts the PLMN over 5GNR radio 505 and the radio frequency. 5GNR BBU 506 receives an authorization request from 5GNR UE 311 over 5GNR radio 505. The authorization request includes a code that corresponds to SEPP 331. 5GNR BBU 506 transfers the authorization request from 5GNR UE 311 to AMF 502. AMF 502 transfers the authorization request from 5GNR UE 311 to SEPP 331. AMF 502 receives an authorization response from SEPP 331. When the authorization response is positive, AMF 502 directs SMF 503 to drive UPF 504 to serve 5GNR UE 311 with the internet-access and media-conferencing services. AMF 502 also directs 5GNR gNodeB 501 to serve 5GNR UE 311 with the internet-access and media-conferencing services. UPF 504 and 5GNR gNodeB 501 to serve 5GNR UE 311 with the internet-access and media-conferencing services. Networks 322-325 are configured and operate in a similar manner using their own PLMNs, IMSIs, UE types, and service IDs to obtain authorization and deliver wireless data services.

Figure 6:
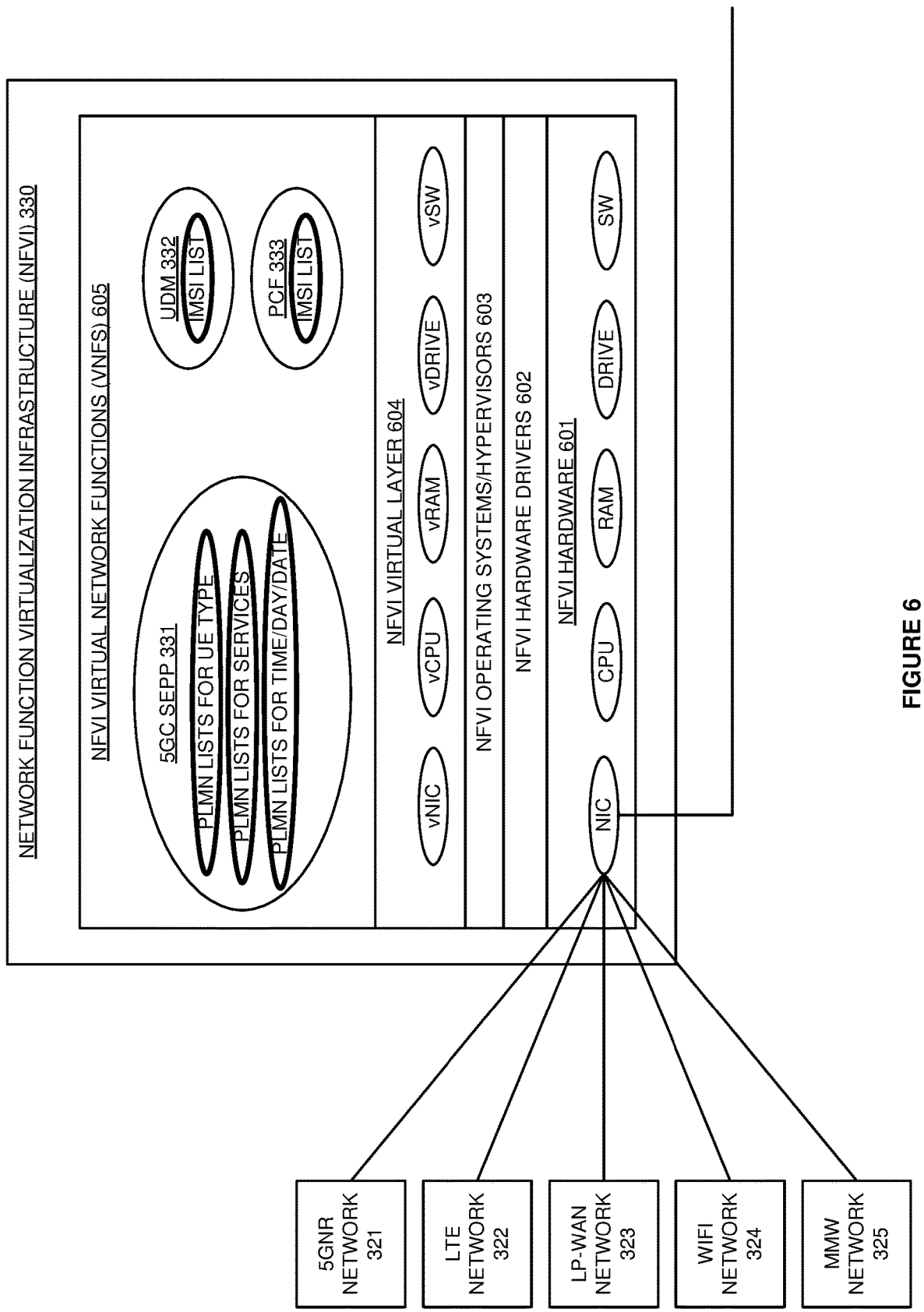
FIG. 6 illustrates a Network Function Virtualization Infrastructure (NFVI) having the 5GC SEPP to authorize UEs based on UE types, wireless services, and network identifiers.

FIG. 6 illustrates Network Function Virtualization Infrastructure (NFVI) 330 that authorizes UEs 311-315 based on UE types, wireless services, and network identifiers. NFVI 330 is an example of network circuitry 130, although network circuitry 130 may differ. NFVI 330 comprises NFVI hardware 601, NFVI hardware drivers 602, NFVI operating systems and hypervisors 603, NFVI virtual layer 604, and NFVI Virtual Network Functions (VNFs) 605. NFVI hardware 601 comprises Network Interface Cards (NIC), CPU, RAM, flash/disk drives, and data switches (SWS). NFVI virtual layer 604 comprises virtual NICs (vNIC), virtual CPUs (vCPU), virtual RAM (vRAM), virtual Drives (vDRIVE), and virtual Switches (vSW). The NIC are coupled to networks 321-325 over backhaul links. The NIC are coupled to external systems over data links. NFVI VNFs 605 comprise 5GC SEPP 331, UDM 332, PCF 333, and typically other VNFs like AMFs, SMFs, UPFs, and the like. NFVI hardware 601 executes NFVI hardware drivers 602, NFVI operating systems and hypervisors 603, NFVI virtual layer 604, and NFVI VNFs 605 to authorize UEs 311-315 for wireless data services over networks 321-325.

5GC SEPP 331 stores Public Land Mobile Network (PLMNs) lists. The PLMN lists are associated with UE types, wireless data services, times, days, dates, preferred networks, and possibly other networking data. The UE types comprise model number, operating system, user application, radio frequency, and/or some other UE-related information. The wireless data services comprise pre-paid services, MVNO services, content-delivery, conferencing, machine-control, sensor networking, or some other wireless networking product. 5GC UDM 332 and/or PCF 333 store International Mobile Subscriber Identifier (IMSI) lists.

5GNR network 321 transfers an authorization request for 5GNR UE 311 to 5GC SEPP 331 that includes the following data: PLMN, IMSI, operating system ID, user application IDs, radio frequency ID, internet-access ID, and media-conferencing ID. 5GC SEPP 331 initially checks the PLMN against a preferred PLMN list. When a match is detected, SEPP 331 transfers a positive authorization response for UE 311 to 5GNR network 321. When no match is detected, SEPP 331 sequentially checks the PLMN against PLMN lists for the operating system ID, user application ID, and radio frequency ID. When a match is detected, SEPP 331 transfers positive authorization response for UE 311 to 5GNR network 321. When no match is detected, SEPP 331 sequentially checks the PLMN against the PLMN lists for the internet-access service and the media-conferencing service (or one PLMN list for the service combination). When a match is detected, SEPP 331 transfers a positive authorization response for UE 311 to 5GNR network 321. When no match is detected, SEPP 331 checks the PLMN ID from UE 311 against PLMN lists for the time, day, date, and so on. When a match is detected, SEPP 331 transfers a positive authorization response for UE 311 to 5GNR network 321.

When no match is detected by SEPP 331, SEPP 331 transfers the IMSI to UDM 332 and PCF 333. UDM 332 and PCF 333 check the IMSI for UE 311 against their IMSI lists. When a match is detected, UDM 332 and/or PCF 333 transfer a positive authorization response for UE 311 to SEPP 331, and SEPP 331 transfers the positive authorization response to 5GNR network 321. When no match is detected, UDM 332 and PCF 333 transfer a negative authorization response for UE 311 to SEPP 331, and SEPP 331 transfers the negative authorization response to 5GNR network 321.

NFVI 330 is configured and operates in a similar manner to authorize UEs 312-315 for wireless data services over networks 322-325. For example, SEPP 331 may authorize LTE UE 312 for voice-calling over LTE network 322 based on the particular radio frequency used by LTE UE 312. SEPP 331 may authorize LP-WAN UE 313 for a sensor uplink over LP-WAN network 323 based on the particular operating system used by LP-WAN UE 313. SEPP 331 may authorize WIFI UE 314 for internet-access over WIFI network 324 based on the particular internet-access service ID. SEPP 331 may authorize MMW UE 315 for a vehicle control service over MMW network 325 based on a specific vehicle application executing in MMW UE 315.

Figure 7:
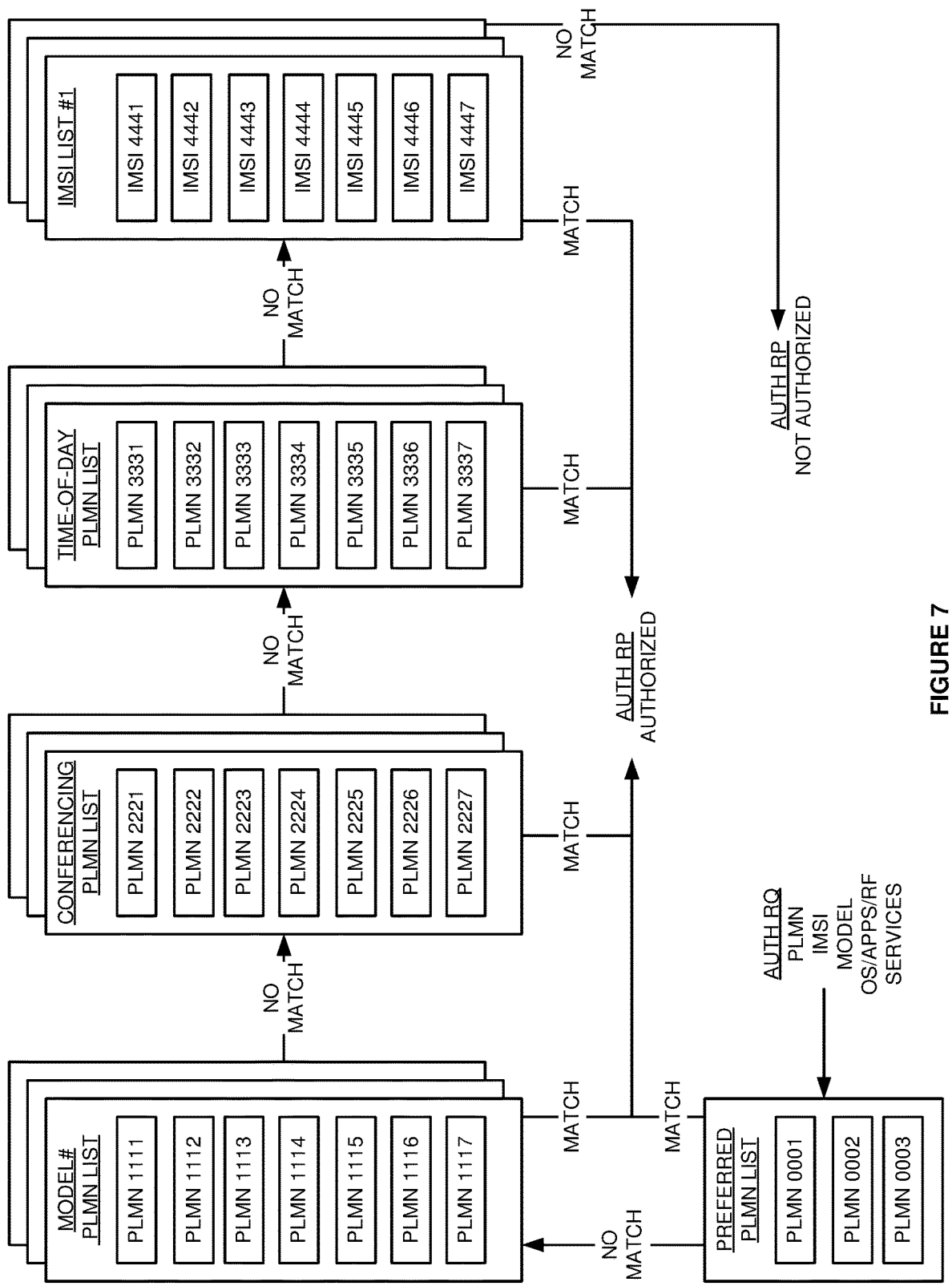
FIG. 7 illustrates the operation of the 5GC SEPP to authorize the wireless UEs based on UE types, wireless services, and network identifiers.

FIG. 7 illustrates the operation of 5GC SEPP 331 to authorize wireless UEs 311-315 based on UE types, wireless services, and network identifiers. 5GC SEPP 331 receives an authorization request (AUTH RQ) for one of UEs 311-315 that includes: PLMN, IMSI, UE type, and services. The UE type comprises model, operating system (OS), user applications (APPS), radio frequency (RF). 5GC SEPP 331 initially checks the PLMN from the authorization request against the PLMNs in a preferred PLMN list. When a match is detected, SEPP 331 authorizes the UE with a positive authorization response (AUTH RP). When no match is detected, SEPP 331 sequentially checks the PLMN against PLMN lists for the UE types (model, operating system, user applications, radio frequency). When a match is detected, SEPP 331 transfers a positive authorization response. For example, SEPP 331 authorizes a UE when the UE indicates a model number for the model number PLMN list and indicates PLMN 1117 which is on the model number PLMN list.

When no match is detected, SEPP 331 sequentially checks the PLMN against the PLMN lists for the wireless data services (internet-access service, media-conferencing service, robot control, and the like). When a match is detected, SEPP 331 authorizes the UE with a positive authorization response. For example, SEPP 331 authorizes a UE when the UE indicates a conferencing ID for the conferencing PLMN list and indicates PLMN 2226 which is on the conferencing PLMN list.

When no match is detected, SEPP 331 checks the PLMN against PLMN lists for the time, day, and date. When a match is detected, SEPP 331 authorizes the UE 311. For example, SEPP 331 authorizes a UE when the UE indicates PLMN 3335 at a time-of-day that corresponds to the time-of-day PLMN list which includes PLMN 3335. When no match is detected at this point, SEPP 331 transfers the IMSI to UDM 332 and PCF 333. UDM 332 and PCF 333 check the IMSI for UE 311 against their IMSI lists. When a match is detected, UDM 332 and/or PCF 333 authorize the UE with a positive authorization response to SEPP 331. When no match is detected, UDM 332 and PCF 333 do not authorize the UE and send a negative authorization response to SEPP 331.

The wireless data network circuitry described above comprises computer hardware and software that form special-purpose network circuitry to authorize wireless UEs based on UE types, wireless services, and network identifiers. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to authorize wireless UEs based on UE types, wireless services, and network identifiers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating network circuitry to authorize User Equipment (UEs) for wireless services from wireless networks that transfer authorization requests for the UEs to the network circuitry when the UEs attach to the wireless networks, wherein the UEs have UE types and the wireless networks have network identifiers, the method comprising:
   authorization circuitry storing network lists that are associated with the UE types and that list at least some of the network identifiers;

transceiver circuitry receiving one of the authorization requests for one of the UEs from one of the wireless networks, wherein the one of the authorization requests indicates one of the network identifiers for the one of the wireless networks and indicates one of the UE types for the one of the UEs, and wherein the one of the UE types comprises at least one of a model number of the one of the UEs, an operating system identifier of the one of the UEs, a user application identifier of a user application on the one of the UEs, and a radio frequency identifier of the one of the UEs;

the authorization circuitry retrieving one of the network lists that is associated with the one of the UE types, comparing the one of the network identifiers from the one of the authorization requests to the network identifiers on the one of the network lists, authorizing the one of the UEs responsive to a match between the one of the network identifiers from the one of the authorization requests and one of the network identifiers on the one of the network lists, and generating a positive response when the one of the UEs is authorized; and the transceiver circuitry transferring the positive response for delivery to the one of the wireless networks that responsively delivers at least one of the wireless services to the one of the UEs.

2. The method of claim 1 wherein the wireless services have service identifiers and the one of the authorization requests indicates at least one of the service identifiers for the one of the UEs, and further comprising:
- the authorization circuitry storing additional network lists that are associated with the service identifiers and that list at least some of the network identifiers; and
- the authorization circuitry retrieving one of the additional network lists that is associated with the at least one of the service identifiers, authorizing the one of the UEs responsive to a match between the one of the network identifiers from the one of the authorization requests and one of the network identifiers on the one of the additional network lists.

3. The method of claim 2 wherein receiving the one of the authorization requests comprises receiving the one of the authorization requests at a time, day, and date, and further comprising:
- the authorization circuitry storing other network lists that are associated with at least one of the time, day, and date and that list at least some of the network identifiers; and
- the authorization circuitry retrieving one of the other network lists that is associated with the at least one of the time, day, and date, authorizing the one of the UEs responsive to a match between the one of the network identifiers from the one of the authorization requests and one of the network identifiers in the one of the other network lists.

4. The method of claim 2 wherein the wireless services comprise at least one of a content-streaming service, a media-conferencing service, an interactive-gaming service, and an augmented-reality service.

5. The method of claim 2 wherein the UEs have UE identifiers and the one of the authorization requests indicates one of the UE identifiers for the one of the UEs, and further comprising:
- the authorization circuitry storing a UE list of at least some of the UE identifiers; and
- the authorization circuitry retrieving the UE list, authorizing the one of the UEs responsive to a match between the one of the UE identifiers from the one of the authorization requests and one of the UE identifiers on the UE list.

6. The method of claim 1 wherein the authorization circuitry comprises a Fifth Generation Core (5GC) Security Edge Protection Proxy (SEPP).

7. The method of claim 1 wherein the UE type comprises the model number of the one of the UEs.

8. The method of claim 1 wherein the UE type comprises the operating system identifier.

9. The method of claim 1 wherein the UE type comprises the user application identifier.

10. The method of claim 1 wherein the UE type comprises the radio frequency identifier.

11. Network circuitry to authorize User Equipment (UEs) for wireless services from wireless networks that transfer authorization requests for the UEs to the network circuitry when the UEs attach to the wireless networks, wherein the UEs have UE types and the wireless networks have network identifiers, the network circuitry comprising:

authorization circuitry configured to store network lists that are associated with the UE types and that list at least some of the network identifiers;

transceiver circuitry configured to receive one of the authorization requests for one of the UEs from one of the wireless networks, wherein the one of the authorization requests indicates one of the network identifiers for the one of the wireless networks and indicates one of the UE types for the one of the UEs, and wherein the one of the UE types comprises at least one of a model number of the one of the UEs, an operating system identifier of the one of the UEs, a user application identifier of a user application on the one of the UEs, and a radio frequency identifier of the one of the UEs;

the authorization circuitry configured to retrieve one of the network lists that is associated with the one of the UE types, compare the one of the network identifiers from the one of the authorization requests to the network identifiers on the one of the network lists, authorize the one of the UEs responsive to a match between the one of the network identifiers from the one of the authorization requests and one of the network identifiers on the one of the network lists, and generate a positive response when the one of the UEs is authorized; and the transceiver circuitry configured to transfer the positive response for delivery to the one of the wireless networks that is configured to responsively deliver at least one of the wireless services to the one of the UEs.

12. The network circuitry of claim 11 wherein the wireless services have service identifiers and the one of the authorization requests indicates at least one of the service identifiers for the one of the UEs, and further comprising:
- the authorization circuitry configured to store additional network lists that are associated with the service identifiers and that list at least some of the network identifiers; and
- the authorization circuitry configured to retrieve one of the additional network lists that is associated with the at least one of the service identifiers, authorize the one of the UEs responsive to a match between the one of the network identifiers from the one of the authorization requests and one of the network identifiers on the one of the additional network lists.

13. The network circuitry of claim 12 the one of the authorization requests is received at a time, day, and date, and further comprising:

the authorization circuitry configured to store other network lists that are associated with at least one of the time, day, and date and that list at least some of the network identifiers; and the authorization circuitry configured to retrieve one of the other network lists that is associated with the at least one of the time, day, and date, authorize the one of the UEs responsive to a match between the one of the network identifiers from the one of the authorization requests and one of the network identifiers in the one of the other network lists.

14. The network circuitry of claim 12 wherein the wireless services comprise at least one of a content-streaming service, a media-conferencing service, an interactive-gaming service, and an augmented-reality service.

15. The network circuitry of claim 12 wherein the UEs have UE identifiers and the one of the authorization requests indicates one of the UE identifiers for the one of the UEs, and further comprising:

the authorization circuitry configured to store a UE list of at least some of the UE identifiers; and the authorization circuitry configured to retrieve the UE list, authorize the one of the UEs responsive to a match between the one of the UE identifiers from the one of the authorization requests and one of the UE identifiers on the UE list.

16. The network circuitry of claim 11 wherein the authorization circuitry comprises a Fifth Generation Core (5GC) Security Edge Protection Proxy (SEPP).

17. The network circuitry of claim 11 wherein the UE type comprises the model number of the one of the UEs.

18. The network circuitry of claim 11 wherein the UE type comprises the operating system identifier.

19. The network circuitry of claim 11 wherein the UE type comprises the user application identifier.

20. The network circuitry of claim 11 wherein the UE type comprises the radio frequency identifier.

* * * * *